United States Patent [19]

Tung et al.

[11] 4,367,919

[45] Jan. 11, 1983

[54] DURABLE GLASS ELEMENTS

[75] Inventors: Chi F. Tung; Benjamin T. Fellows, both of St. Paul, Minn.

[73] Assignee: Minnesota Mining and Manufacturing Company, St. Paul, Minn.

[21] Appl. No.: 245,369

[22] Filed: Mar. 19, 1981

Related U.S. Application Data

[63] Continuation of Ser. No. 101,646, Dec. 10, 1979, abandoned, which is a continuation of Ser. No. 922,533, Jul. 7, 1978, abandoned, which is a continuation-in-part of Ser. No. 820,809, Aug. 1, 1977, abandoned.

[51] Int. Cl.$^3$ .............................. C03C 3/08; G02B 5/28
[52] U.S. Cl. ................................... 350/105; 65/21.1; 501/34; 501/38; 501/51; 501/58; 501/65; 501/77; 501/79; 501/901; 501/903; 501/66; 501/67; 501/59
[58] Field of Search ............... 106/47 Q, 54; 350/105; 65/21.1, 21.2, 21.3, 21.5; 166/180; 501/33, 34

[56] References Cited

U.S. PATENT DOCUMENTS

| | | | |
|---|---|---|---|
| Re. 26,217 | 6/1967 | Rindone | 501/33 |
| 2,939,797 | 6/1960 | Rindone | 501/34 |
| 2,992,122 | 7/1961 | Beck | 501/34 |
| 3,193,401 | 7/1965 | Alexander et al. | 501/34 |
| 3,195,030 | 7/1965 | Herczog et al. | 501/10 |
| 3,251,704 | 5/1966 | Nellessen | 106/195 |
| 3,294,558 | 12/1966 | Searight et al. | 501/34 |
| 3,294,559 | 12/1966 | Searight et al. | 501/77 |
| 3,468,681 | 9/1969 | Jaupain | 501/34 |
| 3,563,771 | 2/1971 | Tung | 501/34 |

FOREIGN PATENT DOCUMENTS

| | | | |
|---|---|---|---|
| 400737 | 4/1966 | Australia | 65/21.1 |
| 45-12504 | 5/1970 | Japan | 501/34 |

*Primary Examiner*—Helen M. McCarthy
*Attorney, Agent, or Firm*—C. Alexander; D. M. Sell; R. R. Tamte

[57] ABSTRACT

Glass microspheres and other glass elements based on $B_2O_3$, BaO, $SiO_2$ and $TiO_2$ have an improved combination of crushing strength, index of refraction, and, especially in some formulations, chemical resistance. The microspheres are especially adapted for use as retroreflective elements in pavement markings.

14 Claims, No Drawings

DURABLE GLASS ELEMENTS

REFERENCE TO RELATED APPLICATIONS

This application is a continuation of prior application Ser. No. 101,646, filed Dec. 10, 1979 and now abandoned, which was a continuation of Ser. No. 922,533, filed July 7, 1978 now abandoned, which was a continuation-in-part of prior application Ser. No. 820,809, filed Aug. 1, 1979, and now both abandoned.

BACKGROUND OF THE INVENTION

Glass microspheres embedded in the surface of painted lines and other pavement markings to serve as retroreflective elements are subjected to extremely destructive conditions, the most common being the myriad number of impacts which the microspheres receive from the wheels of passing vehicles. Such impacts tend to eventually crush and abrade the microspheres, thereby reducing or taking away the transmission of light that is necessary for retroreflection.

This problem has been compounded by the fact that glass microspheres having the higher indexes of refraction best adapted for retroreflectivity in pavement markings (i.e., above 1.5) have been especially susceptible to crushing and abrading. Such higher-index microspheres have had only limited use in pavement markings, which has significantly reduced the reflectivity available from pavement markings.

Glass microspheres in pavement markings are also subject to attack by corrosive agents sometimes present in the air, such as acids formed by various emissions from automobiles, furnaces, industrial plants, etc. Such attack can cause the microspheres to lose transparency, which also reduces or takes away their reflectivity.

SUMMARY OF THE INVENTION

The present invention provides new transparent glass elements, particularly microspheres, which combine high durability, a desirable index of refraction (e.g., 1.6 to 1.9 and preferably about 1.75 or more), and, especially in preferred formulations, good resistance to acidic chemical agents. One aspect of the increased durability is an improved crushing strength. As measured by a test described in the working examples, microspheres of the invention have a crush resistance of at least 3500, and preferably at least 5000, kilograms/square centimeter, which gives the microspheres a longer useful life in a pavement marking.

The ingredients of these new glass elements can be briefly summarized in the following table, in which percentages are given by weight:

| | |
|---|---|
| $B_2O_3$ | 5-60 |
| $TiO_2$ | 20-50 |
| BaO and/or SrO | 10-35 |
| Alkali-metal oxide selected from $Na_2O$ and $K_2O$ | 0-15 |
| $SiO_2$ | 0-40 |
| All other ingredients | 0-15 |

For the best chemical resistance, the compositions generally include at least 20 weight-percent $SiO_2$ and lesser amounts of $B_2O_3$, i.e. less than about 20 weight-percent. For higher crush strengths, the compositions include less $SiO_2$ and more $B_2O_3$.

As is common in the glass art, the constituents in the table are described as oxides, which is the form in which they are presumed to exist in the completed transparent elements of the invention, and which correctly account for the chemical elements and their proportions in the composition. The starting ingredients used to make the glass may be some other chemical compound than an oxide, such as barium carbonate, but the composition becomes modified to the oxide form during melting of the ingredients.

PRIOR-ART STATEMENT

Although many prior-art patents teach glass microspheres made from similar ingredients as the present invention, none of them teach the same compositions or achieves the same results as the present invention. Two of the closest prior-art patents are Searight et al, U.S. Pat. Nos. 3,294,558 and 3,294,559. When the compositions of these patents are tested, they are found to have low crushing strength (for example, 3000 kilograms/square centimeter or less) and high susceptibility to chemical attack. One apparent reason for these deficiencies is the presence in the compositions of significant amounts of calcium oxide, which apparently does not become as strongly associated or bonded to other ingredients of the glass. This poor bonding leaves lines of weakness and possible sites for corrosive agents to leach ingredients from the glass and form an opacifying network of openings. Compositions of the invention are essentially free of CaO.

Another representative prior-art teaching is Rindone, U.S. Pat. No. 2,939,797. Important differences between the glass microspheres taught in that patent and those of the present invention are the high amounts of BaO and $TiO_2$ in the microspheres of the patent, which reduce crushing strength.

Glass microspheres taught in Tung, U.S. Pat. No. 3,563,771, and Beck and Tung, U.S. Pat. No. 2,992,122, have similarities in composition to some of the microspheres of the present invention. However, among other differences, these prior microspheres include coloring agents to make the microspheres either visibly black and infrared-transmissive (the '771 patent) or visibly blue (the '122 patent). This light-filtering action by the prior microspheres would prevent their utility in pavement markings. Pavement markings are intended to provide maximum visibility, and to that end the microspheres in conventional reflective pavement markings transmit at least a major portion of the spectrum of visible light, thereby providing the substantially white reflection that is commonly seen when driving at night on a roadway having reflective pavement markings. The microspheres described in the stated patents could not be useful to provide the conventional reflectivity of pavement markings, which microspheres of the invention do provide; nor do the patents predict the unique characteristics by which microspheres of the invention advance the pavement marking art.

Other representative prior-art patents include Stradley et al, U.S. Pat. Nos. 2,790,723; Beck et al, U.S. Pat. No. 2,853,393; Searight et al, U.S. Pat. Nos. 3,198,461 and 3,293,051; and Tung et al, U.S. Pat. Nos. 3,493,403 and 3,946,130. As with the previously discussed patents, the compositions taught in these patents all differ significantly from compositions of the present invention.

DETAILED DESCRIPTION

The different ingredients in compositions of the invention generally contribute different properties or degrees of a property in proportion to their amount in the composition, and combine with one another to achieve the unique properties of glass elements of the present invention. For at least the components present in larger amounts, there is usually no sharp change in properties with changes in proportions, and numerical ranges stated herein for such components should be understood in that context.

Surprisingly, as low as 5 weight-percent of $B_2O_3$ in a composition of the invention will provide significant improvement in the level of crushing strength over that offered in the prior art. Higher amounts are preferred to obtain higher strengths. Where chemical resistance is important, 10–20 weight-percent of $B_2O_3$ will preferably be used. When chemical resistance is less important, 20, and preferably 25 or 30, weight-percent or more will be used. Above 60 weight-percent, the resulting glass has too low an index of refraction. Preferably, no more than 50 weight-percent $B_2O_3$ is included.

The index of refraction of glass elements of the invention is increased with increasing proportions of $TiO_2$. At least 20 weight-percent $TiO_2$ should be included to achieve the indices of refraction sought, and higher amounts, e.g., 25 or 30 weight-percent, are used to obtain higher indices of refraction, especially when higher amounts of $B_2O_3$ are used. At amounts of $TiO_2$ above 50 weight-percent, crushing strength is too low, and in large-sized microspheres the percentage of non-transparent microspheres in a batch increases. Preferably, glass elements of the invention include no more than about 35 or 40 weight-percent $TiO_2$.

BaO, but alternatively SrO (as a whole or partial substitute for BaO), is included to improve vitreosity of the glass; at least 10 weight-percent, and preferably at least 15 weight-percent should be included. At amounts above about 35 weight-percent BaO, the crushing strength of the microspheres tends to fall below the levels sought for; less than 25 weight-percent is preferably used in the low-$B_2O_3$-containing composition.

Alkali-metal oxide and $SiO_2$ contribute to improved crushing strength, and are preferably included. It is believed that $SiO_2$ forms a network, with which $B_2O_3$ may become associated, and alkali-metal oxide helps distribute $SiO_2$ and $B_2O_3$ throughout the composition. It is theorized that a $B_2O_3$ network may provide resilience and elasticity to the glass to improve its crushing strength. Whether or not that explanation is correct, at least 1 or 2 weight-percent, and preferably at least 5 weight-percent, of alkali-metal oxide and $SiO_2$ are included to achieve the best crushing strength. Also, as previously noted, for the best chemical resistance at least 20 weight-percent $SiO_2$, preferably 25 up to about 35 or 40 weight-percent, is included. The amount of alkali-metal oxide is generally less than 15 weight-percent, and especially in the low-$B_2O_3$-containing compositions, preferably is less than 10 weight-percent. $K_2O$ has proven particularly useful to improve crushing strength, especially when included in an amount of 1–5 weight-percent.

Another desirable ingredient, especially in compositions in which $B_2O_3$ is present in lower amounts, is a fluidizing agent, i.e., an ingredient such as metal fluorides (e.g., NaF, LiF, $BaF_2$, or KF) which makes the molten glass more fluid. Fluorides are also desirable in the low-$B_2O_3$-containing compositions to improve the color of the microspheres, which can become quite dark during large-batch manufacturing operations. Low amounts of the fluorides, i.e., less than about 5 weight-percent, and preferably about 2 or 3 weight-percent or less, are preferred, since larger amounts tend to reduce crushing strength and acid resistance.

Many other ingredients can be included, either to contribute some specific property or to take the place of a portion of one of the other ingredients. Generally these other ingredients do not total more than about 10 or 15 weight-percent of the composition. ZnO is an example of one possible additional ingredient which can be added to provide meltability and fluidity in the glass; however, it also appears to reduce crushing strength and chemical resistance and is therefore not generally used in amounts above 10 weight-percent, and for some compositions of marginal properties, above 5 weight-percent. $Al_2O_3$ is useful especially in the higher-$B_2O_3$-containing compositions, generally in an amount of 1–5 weight-percent, to contribute strength. Another useful ingredient is $As_2O_3$, which can be added to make the glass elements more colorless.

Glass elements of the invention can be prepared by conventional processes. In one useful process for making microspheres the ingredients are measured out in particulate form—preferably between about 0.01 and 50 micrometers in size—and intimately mixed together. They are then melted in a gas-fired or electrical furnace until all the ingredients are in liquid form. The liquid is then quenched in water, dried, and crushed to a small size desired for the final microspheres. The particles may be screened to assure that they are in the proper range of sizes. The crushed particles are then passed through a flame having a temperature generally between about 1100° C. and 1450° C. to spheroidize the particles.

Alternatively, once the batch has been heated to the point where all ingredients are liquid, the liquid batch can be poured into a jet of high-velocity air. Glass microspheres of the desired size are formed directly in the resulting stream. The velocity of the air is adjusted in this method to cause the microspheres formed to have the right dimensions.

Previous teachings about microspheres have noted that for the best retroreflection the microspheres should have good clarity; e.g., should contain no more than 5 weight-percent scattered crystallinity (that is, no more than 5 weight-percent of the microspheres should be rejected as opaque because of crystallinity) and should be at least 95 weight-percent bubblefree. However, while such a degree of clarity is preferred, it is not essential for satisfactory use of microspheres in pavement markings.

Microspheres of the invention can be incorporated into coating compositions (see e.g. Harrington, U.S. Pat. No. 3,410,185; Palmquist et al, U.S. Pat. No. 2,963,378; and Nellessen, U.S. Pat. No. 3,228,897), which generally comprise a film-forming binding material in which the microspheres are dispersed. Or the microspheres may be used in drop-on applications for painted lines or incorporated into preformed retroreflective sheeting or tape. As taught for example in Heltzer et al, U.S. Pat. No. 2,354,018, or Gatzke et al, U.S. Pat. No. 3,915,771, tape useful for pavement markings generally comprises a backing, a layer of binder material, and a layer of microspheres partially embedded in the layer of binder material. The backing can be made from various materials, e.g. polymeric films, metal foils, and fiber-based sheets.

Preferably rather large microspheres, such as in excess of 250 micrometers in diameter, are used in "exposed-lens" pavement markings (i.e., with the microspheres partially embedded in, and partially exposed above, the marking) to provide the best retroreflective properties during precipitation and to minimize the effects of dirt collection. However, microspheres of the invention can be made and used in various sizes (the term "microsphere" or "spherical" is used herein for rounded unitary glass elements used for retroreflection whether or not the elements are perfect spheres). It is difficult to deliberately form microspheres smaller than 10 micrometers in diameter, though a fraction of microspheres down to 2 or 3 micrometers in diameter is sometimes formed as a by-product of manufacturing larger microspheres. Generally the uses for glass microspheres call for the microspheres to be less than 2 millimeters in diameter, and most often less than 1 millimeter in diameter.

For use in pavement markings, the microspheres of the invention should have good weather resistance. One useful test for water resistance is to soak a sample of microspheres in water heated to 180° F. (82° C.). Microspheres of the invention to be used as pavement markings generally exhibit no visible deterioration after 250 hours in this test.

Resistance to attack by acidic agents can be indicated by immersing a sample in an excess of one-percent sulfuric acid (i.e., 100 weight-parts of acid for 1 part of microspheres) for 120 hours; then washing and drying the microspheres; and then visibly determining the percentage of microspheres that have been reduced in transparency. Different degrees of opacification are possible, from cloudy, to frosted, to separation of a thin outer shell of the microsphere from the rest of the microsphere. Microspheres that have been reduced in transparency stand out among the clear unaffected microspheres in a sample. The test is rather severe, but in a batch of preferred microspheres no more than 25 percent, and more preferably, no more than 10 percent, are reduced in transparency.

Glass elements of the invention may be used in other shapes besides microspheres and for other purposes besides retroreflection. For example, they may be used as fibers or as flakes, and their high crush resistance and abrasion resistance adapts them to use for shot blasting or as mechanical plating media.

The invention will be further illustrated by the following examples.

EXAMPLE 1-25

Particles of boric acid, titania, barium carbonate, sodium carbonate, potassium carbonate, and silica having an average diameter of about 5 micrometers were measured out in various proportions (as shown in Table I) to form 70-gram batches. These raw materials were mixed by hand in a mortar and pestle, and the batch was packed into a platinum crucible. The crucible and its contents were then preheated for 2 minutes at 800° C. and then melted at 1350° C. Thereupon the molten liquid was poured into a hot jet of air having a gauge pressure of 28 kilograms/square centimeter.

Glass microspheres were formed and screened in sizes of about 420 to 590 micrometers. The crushing strength of the microspheres was measured in a bead-crushing machine, the major feature of which is two parallel plates made of very hard, non-deforming material (e.g. sapphire or tungsten carbide). A single microsphere of known diameter is placed on the lower plate and the upper plate lowered until the microsphere fails. Crushing strength is the force exerted on the microsphere at failure divided by the cross-sectional area of the microsphere ($\pi r^2$). Ten microspheres of a given composition are tested and the average result is reported as the crush resistance for the composition. Index of refraction was measured by the oil immersion method. Results are given in Table I.

Example 14 is presently a preferred formulation, combining a higher crushing strength with a refractive index of 1.81 (which some studies show to be an especially useful index of refraction in pavement markings having a diffusely reflective layer under the microspheres and when viewing distances are about 100 to 600 feet). Moderate variations from this preferred formulation can give quite similar results.

EXAMPLES 26-30

Glass microspheres with formulations as listed in Table II were made by the procedures outlined in Examples 1-25. Test results are given in Table II.

EXAMPLES 31-35

Glass microspheres with formulations as listed in Table III were made by the procedures outlined for Examples 1-25. Test results are given in Table III.

EXAMPLES 36-72

Glass microspheres with formulations as listed in Table IV were made by the procedures outlined for Examples 1-25. Test results are given in Table IV. Vitreosity values are included to indicate the glassy nature of the microspheres. The values reported are determined by screening a sample into various sizes, and finding the largest size (i.e., diameter) at which no more than 10 percent of the microspheres are opaque.

EXAMPLES 73-84

Glass microspheres with formulations as listed in Table V were made by the procedures outlined for Examples 1-25. Test results are given in Table V.

COMPARATIVE EXAMPLES A-D

Glass microspheres were made by the procedure described above using the formulations given in Rindone, U.S. Pat. No. 2,939,797, Examples 1, 3, 8, and 9. The formulation, crushing strengths, and indexes of refraction are as given in Table VI.

COMPARATIVE EXAMPLES E-M

Glass microspheres were made by the procedures described above using a variety of formulations which include CaO. Included in this set are formulations given in claim 6 of Searight et al, U.S. Pat. No. 3,294,558 (Comp. Ex. H), claim 10, Examples 3 and 17, and compositions as described in column 4 of Searight et al, U.S. Pat. No. 3,294,559 (Comp. Ex. I-M). Test results are as given in Table VII.

TABLE I

| Example No. | Constituents (weight-percent) | | | | | | Melt Time (minutes) | Crush Strength (kilograms/ sq. centimeter) | Index of Refraction |
| --- | --- | --- | --- | --- | --- | --- | --- | --- | --- |
| | $B_2O_3$ | $TiO_2$ | BaO | $Na_2O$ | $K_2O$ | $SiO_2$ | | | |
| 1 | 37.8 | 28.2 | 16.2 | 4 | 1 | 12.8 | 7 | 7306 | 1.73 |
| 2 | 32.8 | 38.2 | " | " | " | 7.8 | 10 | 4219 | 1.765 |
| 3 | " | 28.2 | 26.2 | " | " | " | 7 | 6213 | " |
| 4 | 38.8 | " | 16.2 | 8 | " | " | 5 | 7374 | 1.73 |
| 5 | 23.8 | 38.2 | " | " | " | 12.8 | 6.5 | 5185 | 1.795 |
| 6 | " | 28.2 | 26.2 | " | " | " | " | 4983 | " |
| 7 | 40.8 | " | 16.2 | 4 | 3 | 7.8 | 7 | 6950 | 1.73 |
| 8 | 25.8 | 38.2 | " | " | " | 12.8 | 6 | 3653 | 1.735 |
| 9 | " | 28.2 | 26.2 | " | " | " | 6.5 | 6898 | 1.775 |
| 10 | 20.8 | 38.2 | " | " | " | 7.8 | 7 | 5995 | 1.82 |
| 11 | 31.8 | 28.2 | 16.2 | 8 | " | 12.8 | 6.5 | 7138 | 1.73 |
| 12 | 26.8 | 38.2 | " | " | " | 7.8 | 7 | 6419 | 1.80 |
| 13 | " | 28.2 | 26.2 | " | " | " | 5 | 4840 | 1.775 |
| 14 | 27.3 | 33.2 | 21.2 | 6 | 2 | 10.3 | 5.5 | 6347 | 1.81 |
| 15 | " | " | " | " | " | " | " | 5579 | 1.79 |
| 16 | " | " | " | " | " | " | " | 6473 | " |
| 17 | 37.3 | 23.2 | " | " | " | " | " | 6529 | 1.715 |
| 18 | " | 33.2 | 11.2 | " | " | " | 6.5 | 5921 | 1.73 |
| 19 | 31.3 | " | 21.2 | 2 | " | " | 7 | 6567 | 1.795 |
| 20 | 23.3 | " | " | 10 | " | " | 4 | 3649 | " |
| 21 | 29.3 | " | " | 6 | 0 | " | 6 | 5376 | 1.78 |
| 22 | 25.3 | " | " | " | 4 | " | 5 | 4706 | " |
| 23 | 32.3 | " | " | " | " | 5.3 | " | 5434 | 1.775 |
| 24 | 22.3 | " | " | " | " | 15.3 | " | 5343 | " |
| 25 | 60.0 | 20.0 | 10.0 | 8 | 2 | — | 14 | 4590 | 1.635 |

TABLE II

| Example No. | Constituents (weight parts) | | | | | | Melt Time (minutes) | Crush Stength (kilograms/ sq. centimeter) |
| --- | --- | --- | --- | --- | --- | --- | --- | --- |
| | $B_2O_3$ | $TiO_2$ | BaO | $Na_2O$ | $K_2O$ | $SiO_2$ | | |
| 26 | 26.142 | 34.547 | 22.057 | 5.237 | — | 10.842 | 10 | 5034 |
| 27 | " | " | " | " | 0.543 | " | 8 | 5378 |
| 28 | " | " | " | " | 1.085 | " | 10 | 6300 |
| 29 | " | " | " | " | 2.17 | " | 9 | 5317 |
| 30 | " | " | " | " | 4.34 | " | 10 | 5416 |

TABLE III

| Example No. | Constituents (weight parts) | | | | | | | Melt Time (minutes) | Crush Strength (kilograms/ sq. centimeter) |
| --- | --- | --- | --- | --- | --- | --- | --- | --- | --- |
| | $B_2O_3$ | $TiO_2$ | BaO | $Na_2O$ | $K_2O$ | $SiO_2$ | $Al_2O_3$ | | |
| 31 | 26.142 | 34.547 | 22.057 | 5.237 | — | 10.842 | 2 | 13 | 6039 |
| 32 | " | " | " | " | 0.543 | " | " | 14 | 5097 |
| 33 | " | " | " | " | 1.085 | " | " | 8 | 6239 |
| 34 | " | " | " | " | 2.17 | " | " | 8 | 6484 |
| 35 | " | " | " | " | 4.34 | " | " | 7 | 5359 |

TABLE IV

| Ex. No. | Constituents (weight parts) | | | | | | | Crush Strength (kilograms/ sq. centimeter) | Vitreosity (micrometers) | Chemical Resistance (percent attacked) | Index of Refraction |
| --- | --- | --- | --- | --- | --- | --- | --- | --- | --- | --- | --- |
| | $B_2O_3$ | $TiO_2$ | BaO | $Na_2O$ | $K_2O$ | $SiO_2$ | NaF | | | | |
| 36 | 11.03 | 31.86 | 19.61 | 1.96 | 1.23 | 30.64 | 3.68 | 5698 | 275 | <10 | 1.75 |
| 37 | 9.69 | 38.79 | 17.24 | 5.18 | 1.08 | 26.94 | 1.08 | 4475 | 230 | " | 1.8 |
| 38 | 8.75 | 25.28 | 25.29 | 4.68 | 0.98 | 34.04 | 0.97 | 3846 | 500 | " | 1.765 |
| 39 | 8.06 | 32.25 | 23.3 | 1.44 | 0.90 | 31.37 | 2.69 | 4480 | 275 | " | 1.77 |
| 40 | 15.18 | 26.31 | 16.19 | 4.87 | 1.01 | 35.42 | 1.01 | 5045 | 360 | 40–50 | 1.72 |
| 41 | 13.94 | 33.45 | 14.87 | 1.50 | 0.93 | 32.53 | 2.79 | 5437 | 97 | <10 | 1.735 |
| 42 | 15.37 | 26.64 | 26.64 | 1.64 | 1.03 | 25.61 | 3.07 | 4755 | 360 | 100 | 1.74 |
| 43 | 13.78 | 33.08 | 23.80 | 4.42 | 0.92 | 22.98 | 0.92 | 4721 | 230 | " | 1.775 |
| 44 | 9.82 | 28.38 | 17.47 | 1.75 | 3.28 | 38.21 | 1.09 | 4926 | 360 | 20–30 | " |
| 45 | 7.84 | 31.36 | 22.64 | 4.19 | 2.61 | 30.49 | 0.87 | 6443 | 275 | <10 | 1.76 |
| 46 | 9.29 | 26.86 | 26.86 | 4.97 | 3.10 | 25.82 | 3.10 | 3875 | 500 | 100 | 1.74 |
| 47 | 8.85 | 35.43 | 25.59 | 1.58 | 2.95 | 24.61 | 0.98 | 4574 | 360 | 40–50 | 1.81 |
| 48 | 14.59 | 25.29 | 15.56 | 4.68 | 2.92 | 34.04 | 2.92 | 6099 | " | 30–40 | 1.71 |
| 49 | 15.37 | 36.89 | 16.39 | 1.64 | 3.07 | 25.61 | 1.02 | 5971 | 194 | 60–70 | 1.75 |
| 50 | 15.37 | 26.64 | 26.64 | 1.64 | 3.07 | 25.61 | 1.02 | 5461 | 360 | 100 | 1.745 |
| 51 | 12.21 | 29.31 | 21.17 | 3.92 | 2.44 | 28.50 | 2.44 | 4335 | 275 | 30–40 | " |

TABLE IV-continued

| Ex. No. | Constituents (weight parts) | | | | | | | Crush Stength (kilograms/ sq. centimeter) | Vitreosity (micrometers) | Chemical Resistance (percent attacked) | Index of Refraction |
|---|---|---|---|---|---|---|---|---|---|---|---|
| | $B_2O_3$ | $TiO_2$ | BaO | $Na_2O$ | $K_2O$ | $SiO_2$ | NaF | | | | |
| 52 | 11.85 | 30.62 | 20.75 | 1.97 | 3.17 | 29.64 | 1.98 | 4810 | " | 20–30 | 1.765 |
| 53 | 13.15 | 23.02 | 23.03 | 3.52 | 2.19 | 32.89 | 2.19 | 5641 | 500 | 60–70 | 1.715 |
| 54 | 10.78 | 36.87 | 18.84 | 2.89 | 1.80 | 26.98 | 1.79 | 5275 | 230 | 10–20 | 1.775 |
| 55 | 13.15 | 33.99 | 21.06 | 3.52 | 2.19 | 32.89 | 2.19 | 5667 | " | <10 | 1.745 |
| 56 | 10.79 | 27.88 | 27.87 | 2.88 | 1.80 | 26.98 | 1.80 | 3976 | 360 | 70–80 | 1.76 |
| 57 | 6.30 | 32.55 | 22.06 | 3.37 | 2.10 | 31.51 | 2.10 | 4731 | 275 | 10–20 | 1.765 |
| 58 | 16.78 | 28.9 | 19.62 | 2.99 | 1.86 | 27.98 | 1.86 | 5099 | 360 | 20–30 | 1.74 |
| 59 | 12.09 | 31.25 | 21.17 | 3.24 | 0 | 30.24 | 2.02 | 4354 | 275 | 60–70 | 1.745 |
| 60 | 11.62 | 30.03 | 20.35 | 3.11 | 3.88 | 29.07 | 1.94 | 4974 | 360 | <10 | " |
| 61 | 12.24 | 31.63 | 21.43 | 0 | 2.04 | 30.6 | 2.04 | 4717 | 194 | " | 1.75 |
| 62 | 11.49 | 29.69 | 20.11 | 6.15 | 1.91 | 28.73 | 1.92 | 4732 | 360 | 10–20 | 1.755 |
| 63 | 13.58 | 33.99 | 23.03 | 3.50 | 2.19 | 21.93 | 2.19 | 4404 | 230 | 100 | 1.785 |
| 64 | 10.79 | 27.87 | 18.88 | 2.89 | 1.80 | 35.97 | 1.80 | 6035 | 360 | 40–50 | 1.765 |
| 65 | 12.09 | 31.25 | 21.17 | 3.24 | 2.01 | 30.24 | 0 | 6110 | 275 | 50–60 | 1.75 |
| 66 | 11.62 | 30.04 | 20.35 | 3.11 | 1.94 | 29.07 | 3.88 | 4610 | " | 20–30 | 1.74 |
| 67 | 9.84 | 28.43 | 17.49 | 1.76 | 3.29 | 38.18 | 1.00 | 6012 | 500 | 10–20 | " |
| 68 | 10.53 | 31.65 | 18.54 | 4.20 | 2.62 | 30.74 | 1.72 | 5409 | 390 | <10 | " |
| 69 | 9.67 | 27.73 | 17.09 | 1.70 | 3.22 | 37.37 | 3.21 | 5555 | " | " | 1.735 |
| 70 | 8.71 | 34.36 | 15.39 | 3.07 | 2.89 | 33.65 | 1.92 | 5845 | 275 | " | 1.74 |
| 71 | 12.33 | 31.89 | 16.47 | 3.31 | 3.10 | 30.88 | 2.02 | 6157 | " | " | " |
| 72 | 11.85 | 30.63 | 20.75 | 3.17 | 1.97 | 29.64 | 1.98 | 5589 | " | 10 | 1.75 |

TABLE V

| Ex. No. | Constituents (weight parts) | | | | | | | | Crush Strength (kilograms/ sq. centimeter) | Vitreosity (micrometers) | Chemical Resistance (percent attacked) | Index of Refraction |
|---|---|---|---|---|---|---|---|---|---|---|---|---|
| | $B_2O_3$ | $TiO_2$ | BaO | $Na_2O$ | $K_2O$ | $SiO_2$ | NaF | ZnO | | | | |
| 1 | 11.85 | 30.62 | 20.75 | 3.17 | 1.97 | 29.64 | 1.98 | — | 5409 | 275 | ~25 | 1.75 |
| 74 | " | " | " | " | " | " | 1.98* | — | 4285 | 230 | " | " |
| 75 | 11.62 | 30.02 | 20.34 | 3.11 | 1.93 | 29.06 | 3.92* | — | 3457 | " | 50 | " |
| 76 | 11.85 | 30.62 | 20.75 | 3.17 | 1.97 | 29.64 | 1.98** | — | 5654 | 275 | 40 | " |
| 77 | 11.62 | 30.02 | 20.34 | 3.11 | 1.93 | 29.06 | 3.92** | — | 4530 | " | 60 | 1.76 |
| 78 | 11.85 | 30.62 | 20.75 | 3.17 | 1.97 | 29.64 | 1.98*** | — | 5641 | " | 50 | 1.75 |
| 79 | 11.62 | 30.02 | 20.34 | 1.93 3.11 | 3.92*** 29.06 | — | 4862 | " | " | " | | |
| 80 | 11.40 | 29.46 | 19.96 | 3.05 | 1.90 | 28.51 | 1.90 | 3.80 | 4303 | " | " | " |
| 81 | 10.99 | 28.39 | 19.23 | 2.94 | 1.83 | 27.47 | 1.83 | 7.32 | 4702 | " | 40 | " |
| 82 | 11.85 | 30.62 | 20.75 | 3.17 | 1.97 | 29.64 | — | — | 6110 | " | 50 | " |

*LiF replaced NaF
**BaF$_2$ replaced NaF
***KF replaced NaF

TABLE VI

| Comparative Example No. | Constituents (weight-percent) | | | | Crush Stength (kilograms/ sq. centimeter) | Index of Refraction |
|---|---|---|---|---|---|---|
| | $B_2O_3$ | $TiO_2$ | BaO | ZnO | | |
| A | 14.94 | 35.24 | 49.82 | — | 3020 | 1.930 |
| B | 12.77 | 37.61 | 49.62 | — | 2613 | 1.955 |
| C | 17.65 | 33.85 | 46.17 | 2.33 | 2925 | 1.930 |
| D | 19.86 | 37.84 | 37.21 | 5.09 | 3081 | " |

What we claim is:

1. Durable visibly transparent clear microspheres less than about 2 millimeters in diameter, containing no more than about 5 weight-percent scattered crystallinity, and adapted for use as a reflective element in a pavement marking, said microspheres being formed from glass that consists essentially of ingredients as listed in the following table, in which percentages are given by weight:

TABLE VII

| Comp. Ex. No. | Constituents (weight parts) | | | | | | | | | Crush Stength kilograms/ sq. centimeter | Vitreosity (micrometers) | Chemical Resistance (percent attacked) | Index of Refraction |
|---|---|---|---|---|---|---|---|---|---|---|---|---|---|
| | $B_2O_3$ | $TiO_2$ | BaO | $Na_2O$ | $K_2O$ | $SiO_2$ | NaF | CaO | ZnO | | | | |
| E | 10.94 | 28.28 | 19.16 | 2.93 | 1.82 | 27.37 | 1.82 | 7.66 | — | 2659 | 500 | 100 | 1.75 |
| F | 10.17 | 26.27 | 17.80 | 2.72 | 1.69 | 25.42 | 1.69 | 14.24 | — | 3251 | " | " | " |
| G | 10.56 | 27.29 | 18.49 | 2.83 | 1.76 | 26.41 | 1.76 | 7.39 | 3.52 | 4172 | " | " | " |
| H | 9.5 | 20.0 | 20.0 | 8.0 | — | 25.0 | — | 7.0 | 10.5 | 2978 | " | " | 1.74 |
| I | " | " | " | 14.0 | — | 30.0 | — | 5.0 | 1.5 | 2676 | " | " | 1.70 |
| J* | 0.5 | " | 15.0 | 4.0 | — | 30.0 | — | 30.0 | — | 2324 | " | " | 1.73 |
| K | 2.15 | 21.51 | 32.26 | 2.15 | — | 21.51 | — | 20.43 | — | 2276 | " | " | 1.77 |
| L | 8.2 | 35.23 | 38.96 | — | — | 17.6 | — | — | — | 2993 | 275 | " | 1.87 |
| M* | 5.58 | 23.97 | 26.51 | 5.59 | — | 11.98 | — | 15.98 | 7.99 | 2466 | " | " | 1.80 |

J* Also included 0.5 Al$_2$O$_3$
M* Also included 2.40 Al$_2$O$_3$

| | |
|---|---|
| $B_2O_3$ | 5–20 |
| $TiO_2$ | 20–40 |
| BaO and/or SrO | 10–35 |
| Alkali-metal oxide selected from $Na_2O$ and $K_2O$ | 0–15 |
| $SiO_2$ | 25–40 |
| All other ingredients | 0–15; | said glass being essentially free of CaO, and containing no more than 10 weight-percent ZnO; and said glass having an index of refraction between 1.6 and 1.9, and exhibiting a crush resistance of at least about 3500 kilograms per square centimeter.

2. Microspheres of claim 1 which include at least 1 weight-percent of alkali-metal oxide.

3. Microspheres of claim 1 or 2 which include 0.5 to 5 weight-percent of a metal fluoride.

4. Microspheres of claim 3 in which the metal fluoride is sodium fluoride.

5. Microspheres of claim 1 which include at least 10 weight-percent $B_2O_3$.

6. Durable visibly transparent clear microspheres between about 0.25 and 2 millimeters in diameter, containing no more than 5 weight-percent scattered crystallinity, and formed from glass that consists essentially of ingredients as listed in the following table, in which percentages are given by weight:

| | |
|---|---|
| $B_2O_3$ | 10–20 |
| $TiO_2$ | 25–35 |
| BaO and/or SrO | 15–25 |
| Alkali-metal oxide selected from $Na_2O$ and $K_2O$ | 2–10 |
| $SiO_2$ | 25–35 |
| NaF | 1–3; | said glass being essentially free of CaO and containing no more than 10 weight-percent ZnO, having an index of refraction between 1.6 and 1.9, and exhibiting a crush resistance of at least about 3500 kilograms per square centimeter.

7. Pavement marking tape comprising a backing and a layer of microspheres of claim 1, 2, 4, 5, or 6 carried on the backing.

8. Durable visibly transparent clear microspheres less than about 2 millimeters in diameter, containing no more than 5 weight-percent scattered crystallinity, and adapted for use as a reflective element in a pavement marking, said microspheres being formed from glass that consists essentially of ingredients as listed in the following table, in which percentages are given by weight:

| | |
|---|---|
| $B_2O_3$ | 10–20 |
| $TiO_2$ | 20–40 |
| BaO and/or SrO | 10–35 |
| Alkali-metal oxide selected from $Na_2O$ and $K_2O$ | 0–15 |
| $SiO_2$ | 20–40 |
| All other ingredients | 0–15; | said glass being essentially free of CaO, and containing no more than 10 weight-percent ZnO; and said glass having an index of refraction between 1.6 and 1.9, and exhibiting a crush resistance of at least about 3500 kilograms per square centimeter.

9. Microspheres of claim 8 which include at least 1 weight-percent of alkali-metal oxide.

10. Microspheres of claim 8 which include at least 1 weight-percent $K_2O$.

11. Microspheres of claim 8, 9, or 10 which include 0.5 to 5 weight-percent of a metal fluoride.

12. Durable visibly transparent clear microspheres between about 0.25 and 2 millimeters in diameter, containing no more than 5 weight-percent scattered crystallinity, and formed from glass that consists essentially of ingredients as listed in the following table, in which percentages are given by weight:

| | |
|---|---|
| $B_2O_3$ | 5–20 |
| $TiO_2$ | 25–50 |
| BaO and/or SrO | 15–25 |
| Alkali-metal oxide selected from $Na_2O$ and $K_2O$ | 2–15 |
| $SiO_2$ | 25–40 |
| All other ingredients | 0–15; | said glass being essentially free of CaO and containing no more than 10 weight-percent ZnO, having an index of refraction between 1.6 and 1.9, and exhibiting a crush resistance of at least about 3500 kilograms per square centimeter.

13. Microspheres of claim 12 which include at least 1 weight-percent of $K_2O$.

14. Microspheres of claims 12 or 13 which include 0.5 to 5 weight-percent of a metal fluoride.

* * * * *